United States Patent [19]

Maloney et al.

[11] Patent Number: 4,679,202
[45] Date of Patent: Jul. 7, 1987

[54] GAS LASER TUBE APPARATUS

[76] Inventors: Christopher E. Maloney, 30, High Street, Trumpington, Cambridge; Russell M. Crane, 29, Izaac Walton Way, Cambridge, both of England

[21] Appl. No.: 747,242

[22] Filed: Jun. 21, 1985

[30] Foreign Application Priority Data

Jul. 3, 1984 [GB] United Kingdom ............... 8416916

[51] Int. Cl.⁴ ........................... H01S 3/03; H01S 3/04
[52] U.S. Cl. ........................................ 372/65; 372/34
[58] Field of Search ...................... 372/61, 65, 62, 34

[56] References Cited

U.S. PATENT DOCUMENTS 3,531,734 9/1970 Gordon et al. .................. 372/62
4,504,954 3/1985 Güers et al. .................... 372/61

Primary Examiner—Gene Wan
Attorney, Agent, or Firm—Nelson Kimmelman; Louis Weinstein

[57] ABSTRACT

A gas laser tube has a beryllium inner tube (10) with a precision ground bore aligned on the axis between the anode (20) and the cathode (18) by supporting said inner tube within an alumina outer tube (12) by means of axially spaced, perforated, copper support discs (14). A preferred arrangement has a stainless steel outer jacket forming part of a closed, de-ionized water cooling system.

13 Claims, 9 Drawing Figures

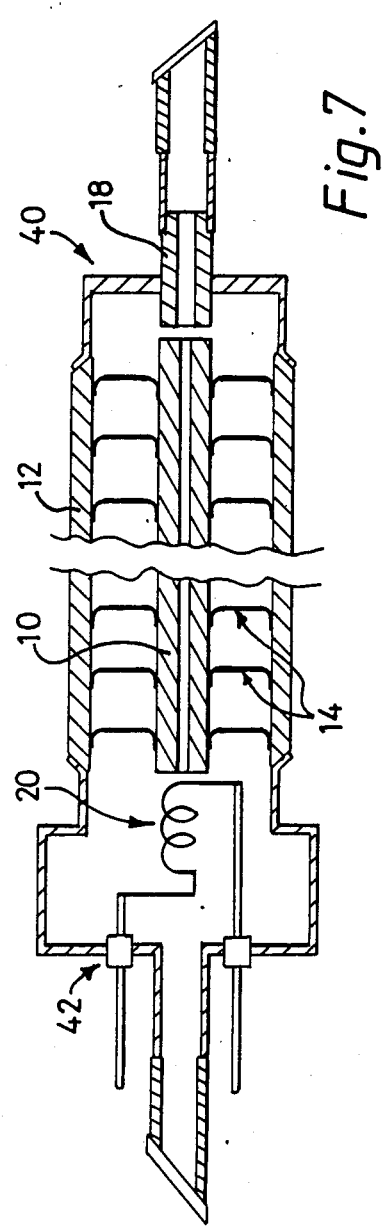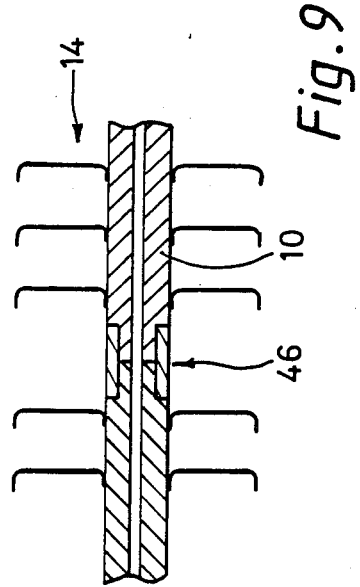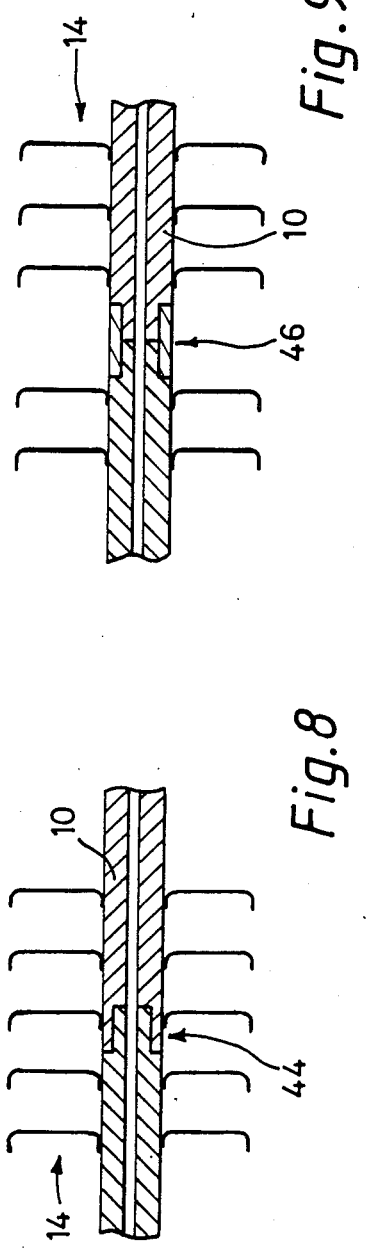

4,679,202

GAS LASER TUBE APPARATUS

FIELD OF THE INVENTION

This invention relates to gas laser tube apparatus, and more especially to an improvement in the construction of the laser tube in particular to enable simplified manufacture and easier alignment.

PRIOR ART

In the accompanying drawings, FIGS. 1 to 3 diagrammatically illustrate three known designs of ion laser tube.

In the design shown in FIG. 1, a continuous bore 10 is formed in a Beryllia rod 12.

In the design shown in FIG. 2, a non-continuous bore 14 extends through thick disc segments 16 of graphite located in a quartz outer tube 18.

In the design shown in FIG. 3, a bore is defined by aligned apertures 20 in tungsten discs 22 axially spaced along an alumina outer tube 24.

In each of FIGS. 1 to 3, the metal anode and metal cathode are identified by reference numerals 26, 28. In each case, the laser tube is terminated beyond the cathode and/or anode by a window assembly, such as a Brewster stub and provision is made for cooling by means of a water jacket at least partly surrounding the tube over the major part of its length.

The known arrangements have various disadvantages, such as risk of cracking at the cathode due to thermal stress, electrolysis at the anode, and risk of the window becoming coated due to sputtering, especially in the case of the design shown in FIG. 3.

Furthermore, the arrangement of FIG. 3 presents a particular problem during manufacture, namely that of ensuring correct alignment on the anode/cathode axis of the centrally apertured tungsten discs. On the other hand, whilst this problem is minimised with the construction of FIG. 1, this arrangement, like that of FIG. 2, presents problems during manufacture due to the difficulty and number of steps required to achieve satisfactory jointing between the glass window assemblies, the metal anode and cathode and the ceramic material around the bore.

This problem is present to a much lesser extent with the construction of FIG. 3, but only at the expense of increased alignment problems.

OBJECT OF THE INVENTION

It is a primary object of this invention to provide a gas laser tube arrangement which avoids or minimises the manufacturing disadvantages of the known laser tube designs above described.

THE INVENTION

Gas laser tube apparatus according to the invention comprises, between the anode and the cathode, a continuous bore formed by inner tubular means centered within an outer tube on the anode/cathode axis by axially spaced discs each fixed in position to at least one of the tubes.

The inner tubular means may be a single tube or two or more tubular parts abutting end to end.

A preferred construction employs an alumina outer tube, an inner tube of beryllia (BeO) and copper support discs. These discs are each preferably connected to the outer tube, and most preferably to the inner tube as well.

The internal bore of the beryllia tube is preferably made by precision grinding.

The support discs are preferably perforated to enable free gas flow between the inner and outer tubes, thus permitting return gas flow, in a manner in itself known from the construction of FIG. 3. Further-more, the discs are preferably convoluted or otherwise shaped to facilitate expansion due to thermal stresses and the like.

A preferred window assembly at each end of the tube arrangement is a Brewster stub.

Cooling may be effected by means of a water jacket, and according to a further feature of the invention a closed cycle de-ionised water system may be employed. The water jacket surrounding the alumina outer tube is preferably made of stainless steel. However, air cooling will often be satisfactory in view of the relatively large surface area of the outer tube.

In practice, the bore in the inner tube may have a diameter of the order of 0.5 to 2.5 mm, typically 1.6 to 2.0 mm, and the outer tube can have a diameter of the order of 25 to 40 mm. It is envisaged that the discharge length may be of the order of 26 cms, but for differing purposes and applications the length of the inner tube may be any value in the range 3 to 45 cm.

In one practical watercooled design, an operating voltage of about 180 V is convenient, delivering about 21 Amps, thereby giving a power input into the tube of about 3780 watts. This operating voltage is readily obtainable from a 240 V single-phase source. However, tubes of different lengths and bores will have different operating voltages and currents.

The practical construction referred to is for an Argon ion laser, but the invention is also applicable to other gas ion lasers such as a Krypton laser.

DESCRIPTION OF THE DRAWINGS

In the accompanying drawings:

FIG. 7 shows a modified arrangement in somewhat diagrammatic manner; and

FIGS. 8 and 9 show possible modifications.

DESCRIPTION OF THE EMBODIMENT

Figure 1:
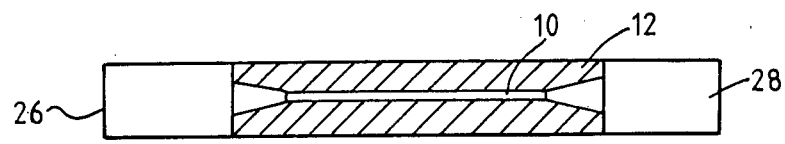
FIGS. 1 to 3 illustrate known laser tube designs as hereinbefore described.
Figure 2:
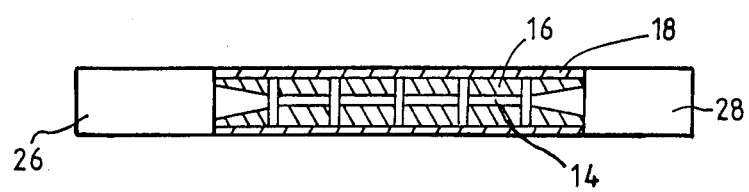
Figure 3:
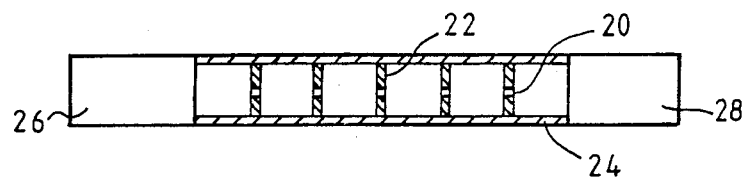
Figure 4:
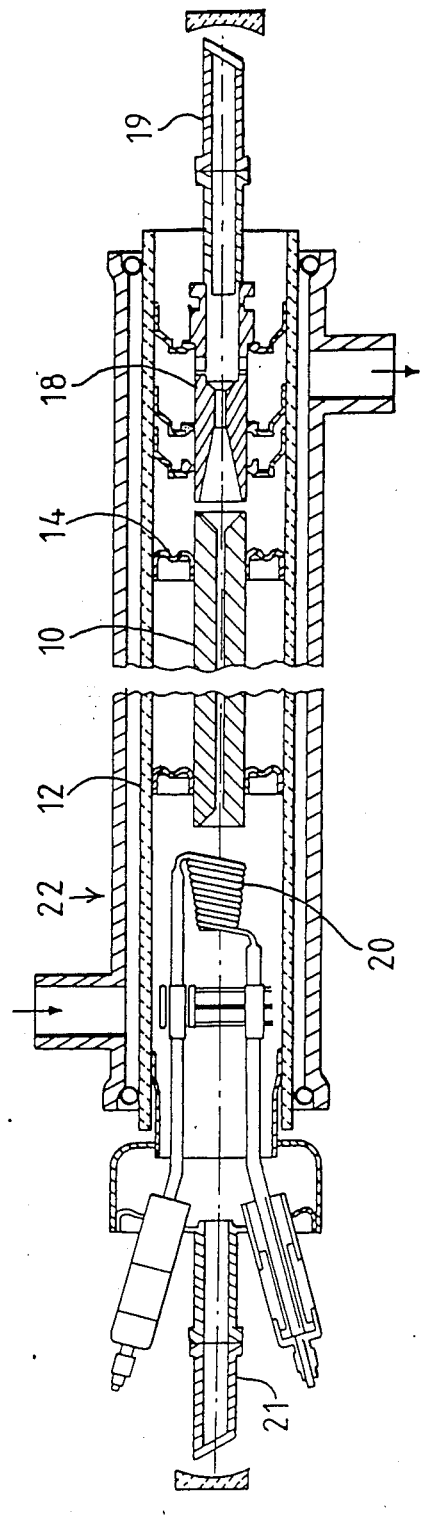
FIG. 4 illustrates a gas laser tube arrangement in accordance with the present invention.
Figure 5:
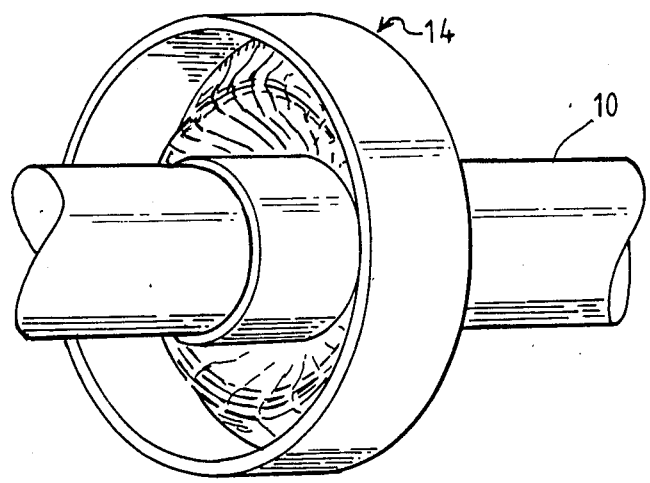
FIG. 5 shows to an enlarged scale the convoluted support discs used in the invention.
Figure 6:
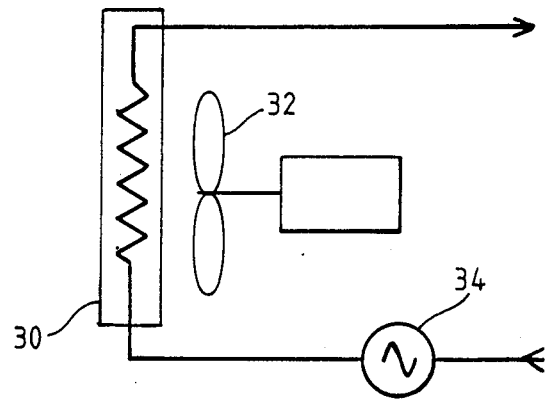
FIG. 6 shows part of a closed loop cooling system.

Referring to FIGS. 4 to 6, the Argon or Krypton filled laser tube has a bore formed by a beryllia tube 10 having a nominal external diameter of the order of 12 mm and a precision ground axial bore of 1.8 mm diameter. This is surrounded by an outer alumina tube 12, say of about 32 mm diameter, which is used to support the bore tube 10 by means of axially spaced copper fins or discs 14. These discs 14 are brazed in position to both the tubes 10 and 12, and contain perforations 16 for return gas flow. In addition, the discs 14 have a convoluted shape (as best shown in FIG. 5) to enable thermal expansion.

The anode 18 and the cathode/heater 20 are brazed in position via suitable supports to the alumina outer tube 12, and the tube arrangement is completed at each end by a Brewster window stub 19 or 20, fixed in position to the cathode and anode supports.

Thus the invention avoids awkward ceramic to glass joints, and alignment problems are minimised as compared with aligning a plurality of annular inserts since the beryllia tube only has to be aligned with the anode/cathode axis. All brazing may be effected in one continuous step, thus simplifying manufacture.

A stainless steel water jacket 22 surrounds the alumina outer tube 12. This forms part of a closed cycle system (see FIG. 6) using de-ionised water which passes through a radiator 30 air cooled by a motor driven fan 32. A pump 34 is employed to ensure good flow.

In addition to the manufacturing and alignment advantages, the laser tube arrangement in accordance with the invention is also found to reduce other disadvantages of the known constructions of laser tube, such as thermal stress at the cathode and electrolysis at the anode.

FIG. 7 shows a modified arrangement employing air cooling, which is practicable due to the relatively large surface area of the outer Alumina tube 12. In this modified arrangement, the anode 18 is not centred by spacers within the outer tube 12; in fact the anode assembly 40 and cathode assembly 42 adjoin the ends of the outer tube in this modification.

FIGS. 8 and 9 show possible modifications wherein the inner Beryllia tube 10 is formed in two abutting parts (although three or more such parts are equally possible provided a continuous bore is defined).

In FIG. 8, two beryllia tube parts are formed with selflocating end portions 44 at their abutting ends.

In FIG. 9, a copper jointing sleeve 46 is employed, which may be brazed in place and centred, although this is not shown, by a disc 14.

An advantage of the modifications exemplified by FIGS. 8 and 9 is that longer continuous precision bores can be formed, notwithstanding limitations on the length of an integral Beryllia tube, which can be satisfactorily bored with high precision.

Various other modifications of the described embodiments are possible within the scope of the invention hereinbefore defined.

We claim:
1. Gas laser tube apparatus comprising:
an alumina outer tube;
an anode;
a cathode;
respective supports for the anode and cathode, said supports being brazed to the outer tube to locate the anode and cathode adjacent opposite ends of the outer tube generally on the axis of said outer tube;
Brewster window stubs carried by the anode and cathode supports;
a beryllia inner tube having a precision ground, continuous, axial bore, and
a plurality of axially spaced copper discs brased to both the outer and inner tubes and locating the inner tube within the outer tube between the anode and cathode with the continuous bore entered along the anode/cathode axis.

2. A gas laser tube according to claim 1 wherein the gas in said tube is selected from the group of gases consisting of Argon and Krypton.

3. A gas laser tube according to claim 1 wherein the discs are perforated to enable gas flow between the inner and outer tubes.

4. A gas laser tube according to claim 1 wherein the discs are convoluted to accomodate thermal expansion.

5. A gas laser tube according to clam 1 wherein the outer tube is air cooled.

6. A gas laser tube according to claim 1 in combination with power supply means for producing an operating voltage selected for given tube dimensions.

7. A gas laser tube according to claim 1 wherein one of the anode and cathode is fixed to the outer tube and is aligned with the outer tube by supporting annular spacers.

8. A gas laser tube according to claim 7 wherein the cooling jacket is made of stainless steel.

9. A gas laser tube according to claim 7 wherein the inner tubular means is formed of two or more tubular parts abutting end to end.

10. A gas laser tube according to claim 1 wherein the outer tube is surrounded by a cooling jacket.

11. A gas laser tube according to claim 10, wherein the cooling jacket forms part of a closed cycle de-ionised water cooling system.

12. A gas laser tube according to claim 1 wherein the inner tube has a diameter in the range 0.5 to 2.5 mm and the outer tube has a diameter in the range 25 to 40 mm.

13. A gas laser tube according to clam 12, having in operation a discharge length of the order of 3 to 45 cm.

* * * * *